United States Patent [19]

Ganslaw et al.

[11] 3,925,288

[45] Dec. 9, 1975

[54] PROCESS FOR PREPARING SALT STABLE LATICES

[75] Inventors: Stuart Harold Ganslaw, Piscataway; James L. Walker, Middlesex, both of N.J.

[73] Assignee: National Starch and Chemical Corporation, Bridgewater, N.J.

[22] Filed: Oct. 3, 1974

[21] Appl. No.: 511,658

Related U.S. Application Data

[63] Continuation-in-part of Ser. No. 310,170, Nov. 28, 1972, abandoned.

[52] U.S. Cl. ............... 260/29.6 TA; 260/29.6 RW; 260/80.8; 260/80 M
[51] Int. Cl.² .................. C08F 2/16; C08F 18/08
[58] Field of Search ............. 260/29.6 TA, 29.6 RN

[56] References Cited
UNITED STATES PATENTS 3,714,096    1/1973   Biale ........................ 260/29.6 H
3,784,498    1/1974   Ceska ....................... 260/29.6 H

*Primary Examiner*—Joseph L. Schofer
*Assistant Examiner*—Peter F. Kulkosky
*Attorney, Agent, or Firm*—Thomas B. Graham

[57] ABSTRACT

A two-step process for preparing salt stable latices useful as flame retardant binders in nonwoven fabrics and paper is disclosed which process comprises (a) polymerizing a small charge (about a 10% portion) of a vinyl monomeric system in the presence of a stabilizing electrolyte containing carboxylic acid groups, surfactant and polymerization catalyst, and thereafter (b) adding to the polymerization mixture the remaining monomeric system over a period of from about 30 minutes to 8 hours, and continuing polymerizing until substantially complete conversion of monomer is achieved.

9 Claims, No Drawings

PROCESS FOR PREPARING SALT STABLE LATICES

This application is a continuation-in-part of U.S. Ser. No. 310,170, now abandoned, filed Nov. 28, 1972 and assigned to the assignee of the instant application.

This invention relates to an improved process for the preparation of salt stable latices useful as flame retardant binders in nonwoven fabrics and paper where improved fire retardant properties are achieved with fire retardant salt/latex resin blends.

BACKGROUND OF THE INVENTION

Nonwoven fabrics and paper are being used more and more extensively for inexpensive disposable garments. In some applications, such as hospital gowns, these garments must be fire resistant, and to this end fire retardant chemicals such as various inorganic salts are commonly added to the binder or web. Presently known polyvinyl acetate or vinyl acetate copolymer latices are known to be suitable for compounding with fire retardant salts to give a binder capable of conferring some fire retardancy to the resultant paper of fabric, but these compositions containing fire retardant salts in small amounts (about 10 - 30%, by weight) do not have adequate fire retardant properties. Use of higher salt concentrations necessary to obtain adequate or superior fire retardant properties tends to coagulate the latex. Therefore, in order for any latex to be more useful as a fire retardant binder, it must be capable of tolerating salt levels above at least 30% without forming grit or coagulum and also remain mechanically stable.

SUMMARY OF THE INVENTION

It has now been found that homo- and copolymers of vinyl acetate capable of tolerating unusually large amounts of fire retardant salts can be prepared in accordance with the process of this invention by polymerizing the monomeric system by means of a two-step process. In the first step, about a 10% portion (i.e. from 5 to 15%) of the vinyl monomer(s) is polymerized employing any commonly used free radical polymerization catalyst and from 1.0 to 7.0%, preferably 2.0 to 4.0% based on the weight of the monomer of a stabilizing electrolyte containing carboxylic acid groups and from 0.1 to 3.0% based on the weight of the monomer of a surfactant. The surfactant may be anionic or nonionic or it may be a combination of the two types. The concentration ranges of stabilizing electrolyte and surfactant specified above are based on total monomer weight used in both steps of the polymerization process, and not on the amount of monomer employed in the first step. The pH of the polymerizing mixture of the first step is ordinarily adjusted to be within pH 3.5 - 5.0 with any common base, for example, aqueous solutions of sodium or potassium hydroxide or ammonium hydroxide.

When the polymerization is substantially completed (which generally may take from about 5 to 40 minutes) the second step is begun which consists of adding the remainder of the monomeric system, preferably in multiple increments, to the polymerization mixture of the first step. The pH of the mixture is not adjusted for or during the second step and the entire polymerization of the two steps is carried out at pH 3.5 - 5.0. The addition of monomers and polymerization of the second step will take between about 30 minutes to 8 hours; preferably about 4 - 7 hours. Polymerization is continued until complete (substantially complete) conversion of monomer is reached. Ordinarily, the temperature at which the polymerizations of both steps are conducted will range from about 40° to 80°C., but temperatures as low as about 33°C. and as high as about 100°C. can be used. The polymerization of monomers herein is always carried out in aqueous systems using sufficient water to produce a final solids content of from about 35 to 55% solids, by weight. In the polymerization of the first step, sufficient water is used to yield a solids content of from about 10 to 35% solids, by weight.

DETAILED DESCRIPTION OF THE INVENTION

The monomer phase used in preparing the vinyl acetate homo- or copolymer latices of this invention may comprise between 10 and 100 per cent, by weight, of vinyl acetate. The remaining portion of the monomer phase will comprise from 0 to 90%, by weight, of one or more ethylenically unsaturated comonomers and, optionally, between 0 and 5.0%, by weight, of a crosslinkable comonomer.

Polymers which may be used in the process of our invention include vinyl acetate homopolymers; and copolymers of vinylacetate with:

1. vinyl esters of the formula:

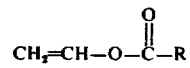

wherein
R is a $C_2$–$C_{12}$ alkyl group. Representative of such vinyl esters are vinyl propionate, vinyl laurate, and vinyl versatate;

2. alkyl esters of acrylic and methacrylic acid having the formula:

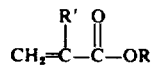

wherein
R is a $C_1$–$C_{12}$ alkyl group, and R' is a hydrogen or a methyl group. Representative of such alkyl esters are methyl acrylate, ethyl acrylate, butyl acrylate, methyl methacrylate, etc.;

3. $C_1$–$C_8$ dialkyl esters of maleic, fumaric and itaconic acids (e.g., dibuty maleate, dioctyl fumarate, etc.); and 4. ethylene.

Also useful are three component interpolymers of vinyl acetate, e.g., vinyl acetate with an alkyl ester of alpha-unsaturated carboxylic acid, and an alpha unsaturated carboxylic acid.

As previously indicated, the monomer phases herein may also contain a crosslinkable comonomer capable of undergoing further reaction after the latex is applied. Suitable comonomers include acrylamide, the N-alkylol, alkyl, and alkylether derivatives of acrylamide wherein the alkyl groups contain from 1 to 8 carbon atoms; hydroxypropyl (ethyl) acrylate and methacrylate, glycidyl acrylate, and methacrylate, etc.

The crosslinkable comonomer may be contained in the monomer system employed in step (a) and step (b) of the process, or alternatively, it may be added to the step (b) polymerization only.

The second essential component required in the preparation of the salt stable latices herein is the stabilizing electrolyte. By definition, the stabilizing electrolytes useful in the process of this invention are the homopolymerizable ethylenically unsaturated monocarboxylic acids which contain from 3 to 5 carbon atoms. Examples of electrolytes include acrylic acid and methacylic acid. Acrylic acid is preferred.

Surfactant useful in the process of this invention may be an ionic or nonionic or a combination of the two types of surfactants.

Suitable anionic surfactants include the higher fatty alcohol sulfates, such as sodium lauryl sulfate, alkylaryl sulfonates, e.g. sodium or potassium isopropylbenzene sulfonates or isopropyl naphthalene sulfonates, alkali metal higher alkyl sulfosuccinates, e.g. sodium octenyl sulfosuccinate, sodium N-methyl-N-palmitoyltaurate, sodium oleyl isothionate, alkali methal salts of alkylarylpolyethoxyethanol sulfates or sulfonates, e.g. sodium t-octylphenoxypolyethoxyethyl sulfate having 1 to 5 oxyethylene units.

Suitable nonionic surfactants include the alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, dodecylphenoxypolyethanol, nonylphenoxypolyethoxythanols, and the like; polyethanol derivatives of methylene linked alkyl phenols; derivatives of long chain carboxylic acids such as lauric myristic, palmitic, oleic, and the like or mixtures of acids containing 6 to 60 or more ethylene oxide units per molecule; analogous ethylene oxide condensates of long-chained alcohols, such as octyl, decyl lauryl, or cetyl alcohols; ethylene oxide derivatives of etherified or esterified polyhydroxy compounds having a hydrophobic hydrocarbon chain and the like.

As already indicated, the surfactant (total) employed in the polymerization herein may range from 0.1 to 3.0% based on the weight of total monomer employed in both steps. It is preferred that a part of the surfactant or surfactant blend of anionic and nonionic surfactants, from about 0.05 to 0.5% by weight of total monomer, be added before the reaction is initiated and the balance added during the reaction of step (b).

Generally, any free radical initiator useful in freeradical polymerization reactions may be employed in the practice of this invention. For example, peroxydisulfates, hydrogen peroxide, t-butyl hydroperoxide and other water soluble peroxides. Also useful are the reducing agent types such as the alkaline earth metal formaldehyde sulfoxylates, bisulfites, metabisulfites, and zinc formaldehyde sulfoxylates, etc. In the preparation of the latices of this invention, it is preferred that sodium or potassium persulfate be used in amounts ranging from 0.2 to 0.5 parts per 100 parts, by weight of the polymerizable composition.

In addition to the above ingredients, the present latices may also contain buffering salts and chain transfer agents.

The binder compositions of this invention may be applied to non-woven fabric and paper by any conventional technique which assures that the web is thoroughly impregnated with the binder. Dipping, spraying, roll coating, padding, etc., are useful methods of applying the composition to the web.

In addition to improved salt stability, the latices prepared according to this invention also provide several other advantages such as improved: mechanical stability, resistance to heat discoloration, and high surface tension.

The latices of this invention, upon the addition of fireretardant salts, e.g. diammonium phosphate, ammonium sulfamate, mono-ammonium phosphate, etc., display an ability to tolerate greater amounts of these salts than conventional latices, yet remain stable and free of grit or coagulum. Thus fire-retardant binders for non-woven fabrics and paper may be prepared by mixing the stabilized latex and the salt constituent, using any suitable technique which ensures complete and thorough dispersal of the ingredients.

The two-step process of this invention enables the practitioner to prepare latices which are stable in the presence of salts, for example fire retardant salts, in concentrations up to 100% by weight of latex emulsion solids, and at times in excess of 150% by weight of latex emulsion solids. Essentially, the desired stability is built into the latex by the use of the stabilizing electrolyte in the initial monomer charge.

The ability of the present latices to tolerate greater amounts of fire retardant salts over non-electrolyte stabilized latices may be evaluated by any conventional quantitative method. For example, a gravimetric method may involve filtering the salt treated latex through a fine mesh screen and thereafter comparing the weight of dried residue to that of a salt-free latex. Other methods may involve titrimetric or combined titrimetric, gravimetric analysis. For the purposes of this invention, a form of the latter method was utilized as described hereinafter.

The invention will now be further illustrated by, but is not intended to be limited to, the following examples. The quantities of the various ingredients are given in parts, by weight, unless otherwise specified.

EXAMPLE I

This example illustrates the preparation of a salt stable latex of this invention using a vinyl acetate monomer, an ethylenically unsaturated monocarboxylic acid electrolyte, and an anionic sodium alkylaryl sulfonate surfactant.

A reaction mixture having in addition to the electrolyte and the surfactant, a portion of the polymerization initiator, was prepared as follows:

Into a one-liter round bottom flask mounted on a heating mantle and equipped with a mechanical stirrer, a nitrogen purge source and reflux condenser there was introduced the following ingredients:

| Ingredients | Amount |
| --- | --- |
| Water (deionized) | 110.0 |
| Sodium Dodecyl Benzene Sulfonate | 0.25 |
| Potassium Persulfate | 0.20 |
| Acrylic Acid | 3.0 |

The ingredients were thoroughly mixed in a nitrogen atmosphere. To the resultant aqueous mixture adjusted to a pH of 3.75 (using a 50% sodium hydroxide solution) there was then added 10 parts of vinyl acetate. This mixture was thereafter gradually heated to and maintained at 70°C. under slow stirring until polymerization was initaited as indicated by a slight bluish-white color formation. Polymerization was continued for approximately 5 minutes. Then during the four hour period which followed, there were added, in increments, 90 more parts of vinyl acetate and 0.2 more parts of potassium persulfate in 5 parts of water. Throughout the addition period and for 2 hours subsequent thereto, slow stirring was continued, and the reaction temperature was maintained at 75°C. Upon completion of the latter period, the contents of the reaction vessel was colled to 30°C. and then discharged.

Salt Tolerance: To evaluate the ability of the latices herein to tolerate proportionately greater amounts of fire-retardant salts, a quantitative test was conducted in each case as follows:

A 100.0 g. sample of the latex, having a solid content adjusted to 45 per cent, was weighed and then poured into a beaker equipped with a stirrer. A reagent solution comprising 150.0 g. of a 30 per cent diammonium phosphate (DAP) solution was then titrated, at a rate of aboout 100 cc. per minute, into said beaker until gelling or coagulation was observed. The amount of reagent solution required was recorded, and the salt tolerance of the latex (expressed in %) was calculated as follows:

$$\text{DAP Tolerance of Latex in \%} = \frac{(\text{gm of DAP sol'n} \times 0.3)(100)}{\text{gm of sample} \times \frac{\% \text{ solids}}{100}} = \frac{(0.3)(\text{gm of DAP sol'n})}{(0.45)}$$

Mechanical Stability: To determine mechanical stability, a quantity of the test sample was subjected to a high shear blending for at least 15 minutes. Thereafter the stability of the sample was evaluated on the basis of any undesirable coagulation or grit formation observed.

By using the tests described above, it was determined that the resulting product was capable of tolerating in excess of 100 per cent, by weight, of the latex solids of diammonium phosphate and the product exhibited excellent mechanical stability.

EXAMPLE II

This example illustrates the preparation of a salt stable latex of this invention using a vinyl acetate monomer and an N-hydroxyalkyl acrylamide crosslinkable monomer.

Example I was repeated, except 6.7 parts of a 60 per cent N-methylolacrylamide solution was also added to the vessel, in increments, during the four hour reaction period of the second step. The excellent product obtained showed salt tolerance ability and mechanical stability comparable to that of Example I.

EXAMPLE III

This example illustrates the usefulness of a comonomer system with a crosslinkable comonomer electrolyte of acrylic acid, and an anionic surfactant in combination with a nonionic surfactant in the preparation of a salt stable binder typical of this invention.

To make the present binder, the procedural steps of Example I were repeated using ingredients of the type described above. The formulations of the reaction mixture and the monomer system herein which respectively replaced those utilized in the referred to example were as follows:

| Ingredients | Amount |
| --- | --- |
| Water (deionized) | 85.0 |
| Sodium Dodecyl Benzene Sulfonate | 0.1 |
| Octylphenoxypolyethoxyethanol (30 ethoxy groups per mole) | 1.3 |
| Potassium Persulfate | 0.2 |
| Acrylic acid | 4.0 |

The pH of the above-described solution was adjusted to 4.5 using a 50% sodium hydroxide solution.

The monomer system consisted of 75 parts of vinyl acetate and 25 parts of vinyl versatate and 3 parts of N-methylolacrylamide in 27 parts of water.

The resultant product, when tested in the above described manner, indicated a salt tolerance ability in excess of 100%, by weight, of latex solids and also exhibited excellent mechanical stability.

EXAMPLE IV

This example illustrates the usefulness of a particular comonomer system employing an electrolyte of methacrylic acid and an anionic surfactant in the preparation of a salt stable latex.

In this case a comonomer system comprising 80 parts of vinyl acetate and 20 parts of ethylene was polymerized using about 10 parts of the system in the first step in a reaction mixture having the following formulation:

| Ingredients | Amount |
| --- | --- |
| Water (deionized) | 120.0 |
| Sodium Dodecyl Benzene Sulfonate | 0.27 |
| Potassium Persulfate | 0.5 |
| Methacrylic Acid | 3.0 |

The pH of the above described solution was then adjusted to 4.0 using a 50% sodium hydroxide solution.

In general, the procedure utilized herein was similar to that employed in Example I, except the polymerization was carried out in a one-liter reactor at a pressure of 750 psi over a 5.5 hour period and held thereafter for 3 instead of 2 hours. Then the reactor was cooled to 30°C., and the excess ethylene was vented. When tested, the latex displayed salt tolerance ability and mechanical stability comparable to the respective results obtained from the product of Example I.

EXAMPLE V and VI

These examples illustrate the usefulness of vinyl acetate comonomer systems, each having a crosslinkable comonomer present, together with an electrolyte of acrylic acid, and an anionic surfactant (Ex. V), or an anionic surfactant combined with a nonionic surfactant (Ex. VI) in the preparation of salt stable latices.

The monomer system of Example V contained 90 parts of vinyl acetate, 10 parts of ethylene and 3.0 parts of N-methylolacrylamide. The monomer system of Example VI contained 60 parts of vinyl acetate, 40 parts of ethylene and 3.0 parts of N-methylolacrylamide.

The respective reaction mixtures were comprised as follows:

| Ingredients | Amount (parts) Ex. V | Ex. VI |
|---|---|---|
| Water (deionized) | 110.0 | 110.0 |
| Dioctyl Ester of Sodium Sulfosuccinic Acid | 0.32 | 0.25 |
| Octylphenoxypolyethoxyethanol (30 ethoxy groups per molecule) | 0.50 | — |
| Potassium Persulfate | 0.50 | 0.60 |
| Acrylic Acid | 2.5 | 3.0 |

Each of these solutions was treated with a sufficient quantity of sodium hydroxide solution (50%) to yield a pH of 4.5 in Example V and a pH of 4.0 in Example VI.

Using about 10 parts of the designated monomer system as described above with the particular reaction mixture, polymerization of the first step was initiated. Subsequent polymerization was carried out in each case according to method set forth in Example IV at pressures of 350 psi and 1,500 psi respectively.

EXAMPLES VII – XI

These examples illustrated the preparation of several salt stable latices employing various comonomers and variations in the procedure.

The ingredients for the various latices are given in Table I, below.

TABLE I

| | Ingredients | Parts (Examples) VII | VIII | IX | X | XI |
|---|---|---|---|---|---|---|
| A | Water | 100.0 | 100.0 | 100.0 | 100.0 | 100.0 |
| | Potassium Persulfate | 0.15 | 0.15 | 0.15 | 0.40 | 0.25 |
| | Acrylic Acid | 2.5 | 6.0 | 2.0 | — | — |
| | Methylacrylic Acid | — | — | — | 4.0 | 4.0 |
| | Aerosol MA-80 | 0.15 | 0.15 | 0.15 | 0.15 | 0.15 |
| | Triton X-305 | 0.20 | 0.20 | 0.20 | 0.20 | 0.20 |
| | Sodium Hydroxide (to adjust to pH) | 4.5 | 4.5 | 4.5 | 5.0 | 5.0 |
| B | Vinyl Acetate | 30 | 30 | 30 | 100 | 30 |
| | Butyl Acrylate | 70 | 70 | 70 | — | 70 |
| | Isobutoxymethyl Acrylamide | — | 2.0 | — | — | — |
| C | Water | 50 | 50 | 50 | 50 | 50 |
| | Aerosol MA-80 | — | 0.50 | — | — | — |
| | Triton X-305 | 0.20 | 2.00 | 0.50 | 1.0 | 1.0 |
| | N-Methylol Acrylamide | 1.0 | — | — | — | — |
| | Acrylamide | — | — | 1.5 | — | — |
| | Acrylic Acid | — | — | 2.0 | — | — |
| D | Water | 5.0 | 5.0 | 5.0 | 5.0 | 5.0 |
| | Potassium Persulfate | 0.20 | 0.20 | 0.20 | 0.20 | 0.20 |

The ingredients of group A listed in Table I were introduced into a one-liter round bottom flask mounted on a heating mantle and equipped with a mechanical stirrer, a nitrogen purge source and reflux condenser. The ingredients were thoroughly mixed in a nitrogen atmosphere after which an initial portion (as indicated in Table II) of group B ingredients was added to the respective mixtures before each was heated to 75°C.

TABLE II

| Example | Group B ingredients added initially |
|---|---|
| VII | 10% |
| VIII | 15% |
| IX | 10% |
| X | 10% |
| XI | 5% |

Heating of the respective reaction mixtures was initiated. When the mixture reached 75°C. and polymerization was evidenced by development of a blue-white color in the mixture, a slow addition over a three-hour period of the remaining portion of B group ingredients, as well as the ingredients from the C and D groups, was begun while maintaining the mixture at 75°C.

On completion of the addition of all ingredients, the reaction mixture was held at 75°C. for an additional one hour period and thereafter was allowed to cool to room temperature.

An excellent latex product was obtained in each case and samples of the products of Examples VII–XI were evaluated for Salt Tolerance as described in Example I. All samples showed a DAP Tolerance exceeding 100%.

Summarizing, it is thus seen that our invention makes possible the preparation of stabilized, synthetic latices which are capable of tolerating unusually large amounts of fire-retardant salts thereby providing latices particularly useful as fire-retardant binders for nonwoven fabrics and paper.

Variations may be made in proportions, procedures and materials without departing from the scope of this invention which is defined by the following claims.

We claim:

1. A process for preparing a salt stable latex comprising
   a. polymerizing about 5 to 15 parts of a polymerizable monomeric system selected from the group consisting of vinyl acetate and mixtures of vinyl acetate and at least one copolymerizable ethylenically unsaturated comonomer in an aqueous medium containing a free radical polymerization initiator, from 1.0 to 7.0% of a stabilizing electrolyte selected from the group consisting of homopolymerizable ethylenically unsaturated monocarboxylic acids which contain from 3 to 5 carbon atoms, and from 0.1 to 3.0% of a surfactant selected from the group consisting of anionic and nonionic surfactants and mixtures thereof, at a pH of 3.5 to 5.0 and at a temperature of from 40° to 80°C., and
   b. adding to the polymerization mixture of step (a) while polymerization is continued the remaining 95 to 85 parts of the monomeric system of step (a) in incremental portions and polymerizing the monomeric system to substantially complete conversion to yield a salt stable latex, wherein the total amount of monomer added in steps (a) and (b) is equal to 100 parts and wherein the percentages of electrolyte and surfactant are based on the total monomer weight.

2. The process of claim 1 wherein the monomeric system of step (a) or step (b) contains up to 5.0%, by weight, of a polymerizable crosslinkable comonomer selected from the group consisting of acrylamide, N-methylolacrylamide, hydroxymethylated diacetone acrylamide, hydroxypropyl acrylate and methacrylate, hydroxyethyl acrylate and methacrylate, glycidyl acrylate and methacrylate, and isobutoxymethylacrylamide.

3. The process of claim 1 wherein the ethylenically unsaturated comonomer is selected from the group consisting of
  i. vinyl esters of the formula

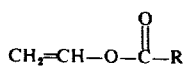

wherein R is a $C_2$-$C_{12}$ alkyl group,
  ii. alkyl esters of acrylic and methacrylic acid having the formula

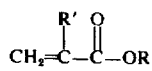

wherein R is a $C_1$-$C_{12}$ alkyl group and R' is a hydrogen or methyl group,
  iii. $C_1$-$C_8$ dialkyl esters of maleic, fumaric and itaconic acids, and
  iiii. ethylene.

4. The process of claim 1 wherein the polymerization is conducted at temperature of 65° - 80°C.

5. The process of claim 1 wherein there is added in step (b) additional stabilizing electrolyte of step (a) in an amount such that the total electrolyte used in steps (a) and (b) does not exceed about 7.0% based on total monomer weight.

6. The process of claim 1 wherein the monomeric system is vinyl acetate and the electrolyte is acrylic acid.

7. The process of claim 6 wherein the monomeric system includes N-methylolacrylamide.

8. The process of claim 2 wherein the monomeric system comprises vinyl acetate, ethylene, acrylic acid and N-methylolacrylamide.

9. The process of claim 2 wherein the monomeric system comprises from 20 - 50% vinyl acetate, from 80 - 50% butyl acrylate, from 1 - 4% acrylic acid and from 1 - 3% N-methylolacrylamide.

* * * * *